United States Patent [19]

Liu

[11] Patent Number: 5,145,243
[45] Date of Patent: Sep. 8, 1992

[54] UPSTANDING MOTHER BOARD STRUCTURE FOR A PERSONAL COMPUTER

[75] Inventor: Morgan C. Liu, Taoyuan, Taiwan

[73] Assignee: Enlight Corporation, Taoyuan, Taiwan

[21] Appl. No.: 748,444

[22] Filed: Aug. 22, 1991

[51] Int. Cl.$^5$ .............................................. A47B 88/00
[52] U.S. Cl. ................................................... 312/265.1
[58] Field of Search ...................... 312/257.1, 263, 264, 312/265.6, 223, 319

[56] References Cited

U.S. PATENT DOCUMENTS

| | | | |
|---|---|---|---|
| 3,956,977 | 5/1976 | Turko et al. | 312/265.6 |
| 4,903,866 | 2/1990 | Lowe | 312/270 |
| 5,035,470 | 7/1991 | Miller | 312/265.6 |

Primary Examiner—Joseph Falk
Attorney, Agent, or Firm—Ladas & Parry

[57] ABSTRACT

An upstanding mother board structure comprises a rectangular pan-like mother board mounting plate on which a slidable U-shaped fastener is attached to secure the mother board mounting plate to the support bracket of a computer. The U-shaped fastener comprises a horizontal section and two vertical sections of which each of the vertical sections is guided by a pair of guiding members and each has a pair of protruding lugs formed in the end thereof to be biased by extension springs to secure the mother board mounting plate. A least one combination of gripper and positioning block is provided on the bottom plate of the base frame of the computer to guide the installation of the mother board mounting plate and to further securely fix the mother board mounting plate.

6 Claims, 6 Drawing Sheets

UPSTANDING MOTHER BOARD STRUCTURE FOR A PERSONAL COMPUTER

BACKGROUND OF THE INVENTION

This invention relates to a personal computer having an upstanding structural arrangement of the parts thereof and in particular to a mother board structure which is secured by means of a slidable fastener.

Generally speaking, a computer is the assemblage of mechanical and electronic components, including illustratively disk drivers (both hard and floppy disk drivers), mother board on which chips, such as the CPU, floating point coprocessor, RAMs (random access memories) and ROMs (read only memories) are integrated, control card, and if appropriate, ventilation fan. Since there are so many parts assembled together in such a small space, maintainability is generally inefficient. For example, for a personal computer having an upstanding structure, to meet the requirement of minimizing size, the interior space above the mother board is utilized to the most compact extent. This, although effectively reducing the size, increases the time and labor in maintenance or installation of the mother board. An improvement is made by installing the mother board in a supporting frame and then securing the supporting frame in the computer casing or base. Some of the known personal computers of this type use screws to secure the supporting frame. This type of securing means, however, is time-consuming in installation and thus maintenance. Some other known personal computers use a vertically slidable supporting frame to install the mother board. To provide slidability, much more space should be preserved for the supporting frame. This adversely affects the utilization of the interior of the computer. Besides, it is also very difficult to install a mother board with components of larger size thereon because of the slide of the mother board with respect to the other components of the computer. Moreover, the larger sized components on the mother board may be damaged by collision during installation or dismantlement.

SUMMARY OF THE INVENTION

It is therefore an object of the present invention to provide an upstanding mother board structure for a personal computer which comprises a slidable fastener to secure a mother board mounting plate to a base frame of the computer and a least one combination of gripper and positioning block to guide the installation of the mother board mounting plate.

Another object of the present invention is to provide an upstanding mother board structure for a personal computer, wherein the mother board mounting plate is installed from an inclined angle so as to reduce the interference with other parts of the computer while still providing efficient installation.

A further object of the present invention is to provide an upstanding mother board structure for a personal computer, wherein a plurality of guiding blocks are provided to provide an efficient positioning of the mother board mounting plate.

These and other objects, advantages and features of the present invention will be more fully understood and appreciated with reference to the written specification and appended drawings.

DETAILED DESCRIPTION OF THE INVENTION

Figure 1:
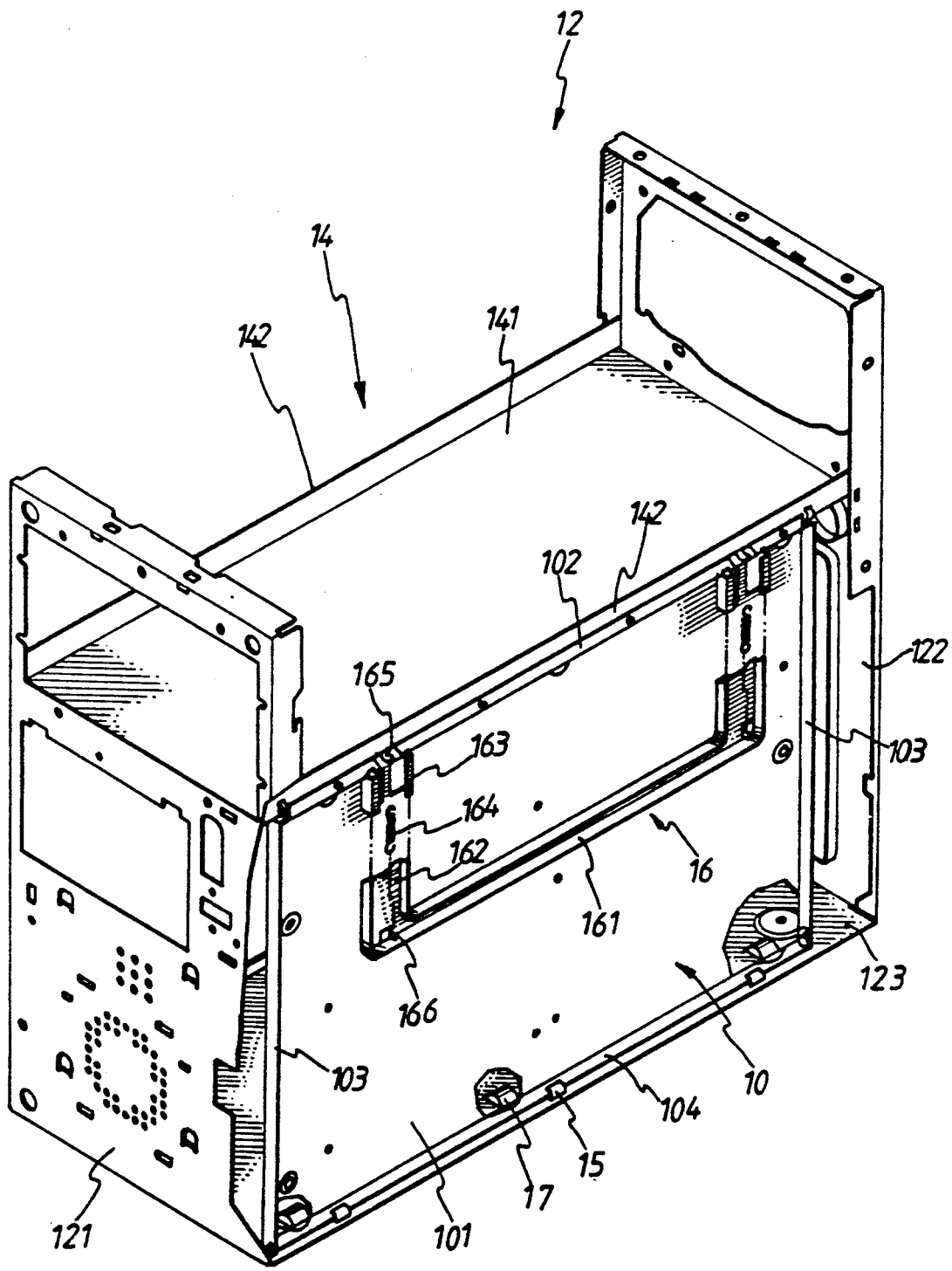
FIG. 1 is a perspective view illustrating the installation of a mother board mounting plate on the base frame, wherein an U-shaped fastener is exploded to show the detail thereof, in accordance with the present invention.
Figure 2:
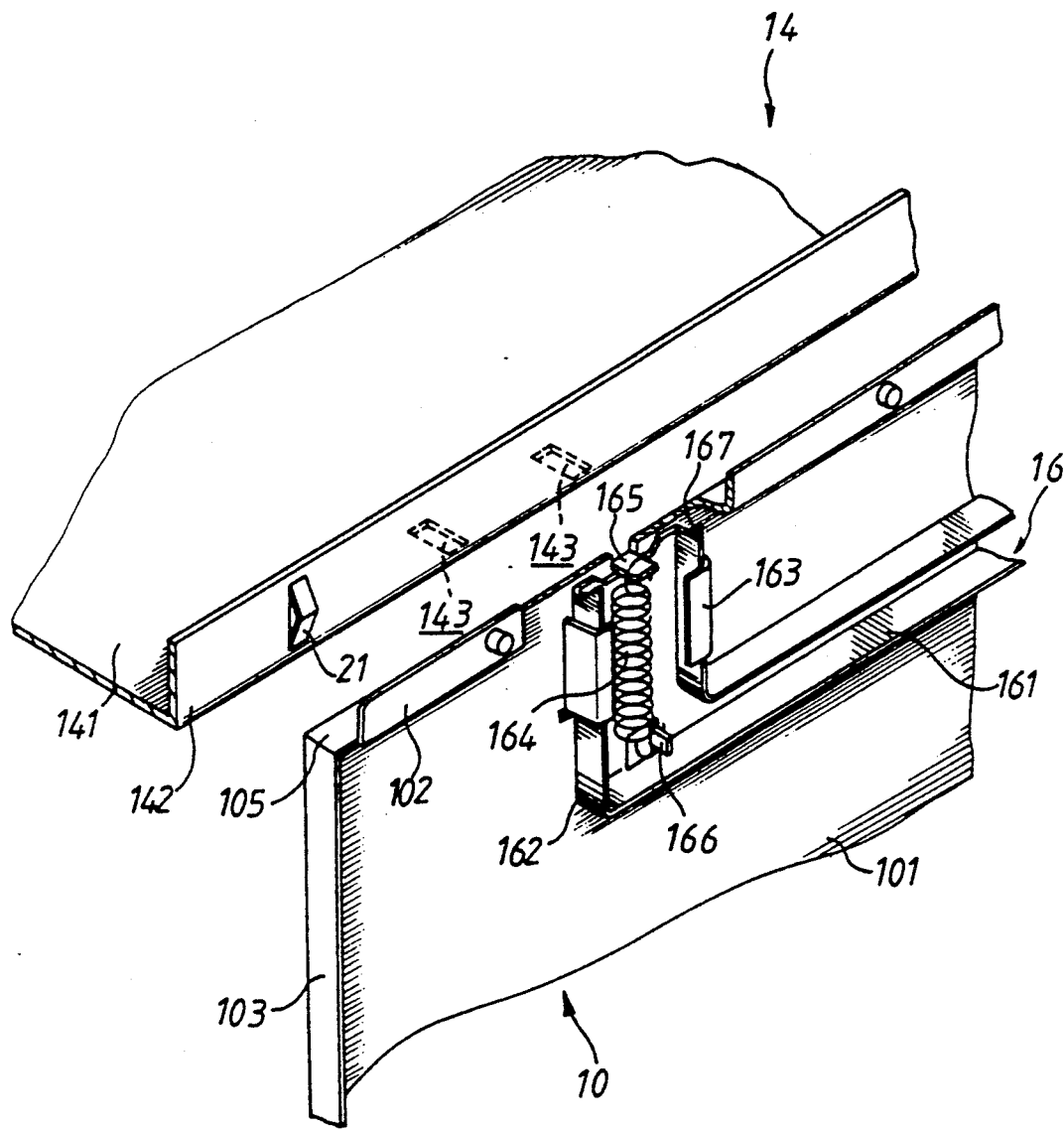
FIG. 2 is an enlarged view of a portion of a support bracket and a mother board mounting plate illustrating the relationship therebetween.

With reference to the drawings and in particular to FIGS. 1 and 2, a personal computer in accordance with the present invention comprises a casing (not shown), inside which is a base frame 12 constituted by a front plate 121 and, a rear plate 122 with a bottom plate 123 and a support bracket 14 secured between the front plate 121 and the rear plate 122. The support bracket 14 comprises a bracket body 141 and two flanges 142 normal to the bracket body 141. A mother board mounting plate 10 is a rectangular pan-like member secured between the bottom plate 123 and the support bracket 14. The mounting plate 10 comprises a plate body 101, a top edge member 105, two lateral edge members and member 103, a bottom edge 104 in a normal direction to the plate body, and a stopping strip 102 extended along and perpendicular to the top edge member 105 to engage one of the flanges 142. A slidable U-shaped fastener 16 comprises a horizontal linear section 161 and two sections 162 which are perpendicular thereto, i.e. vertical when the linear section is horizontal. The fastener is attached to the mother board mounting plate 10 with two extension springs 164 respectively associated with the vertical sections 162. Each of the vertical sections 162 is received in a pair of guiding members 163 formed on the plate body 101 in proximity to the top edge 105 and guided thereby. Each of the vertical sections 162 has a pair of protruding lugs 167 formed in the end thereof, preferably, each of the protruding lugs 167 has an inclined surface. The protruding lugs 167 extend out of the top edge member 105 by the extension springs 164 and engage with slots 143 formed on the bracket body 141 in proximity to the one of the flanges 142, to secure the mother board mounting plate 10 to the support bracket 14. Each of the extension springs 164, by having one end thereof secured on a first projection 165 formed on the mother board mounting plate 10 and the other end thereof secured on a second projection 166 on the slidable fastener, reversibly urges the slidable fastener 16 to move upwards. When the top end of each of the vertical sections 162 thus comes into contact with the first projection 165, it prevents the fastener 16 from moving upwards further and by thus cooperating with the extension springs 164, keeps the fastener 16 in a suitable location.

A least one combination of gripper 15 and positioning block 17 is provided on the bottom plate 123 of the base frame 12 to guide the installation of the mother board mounting plate 10 and further to securely fix it.

Figure 3:
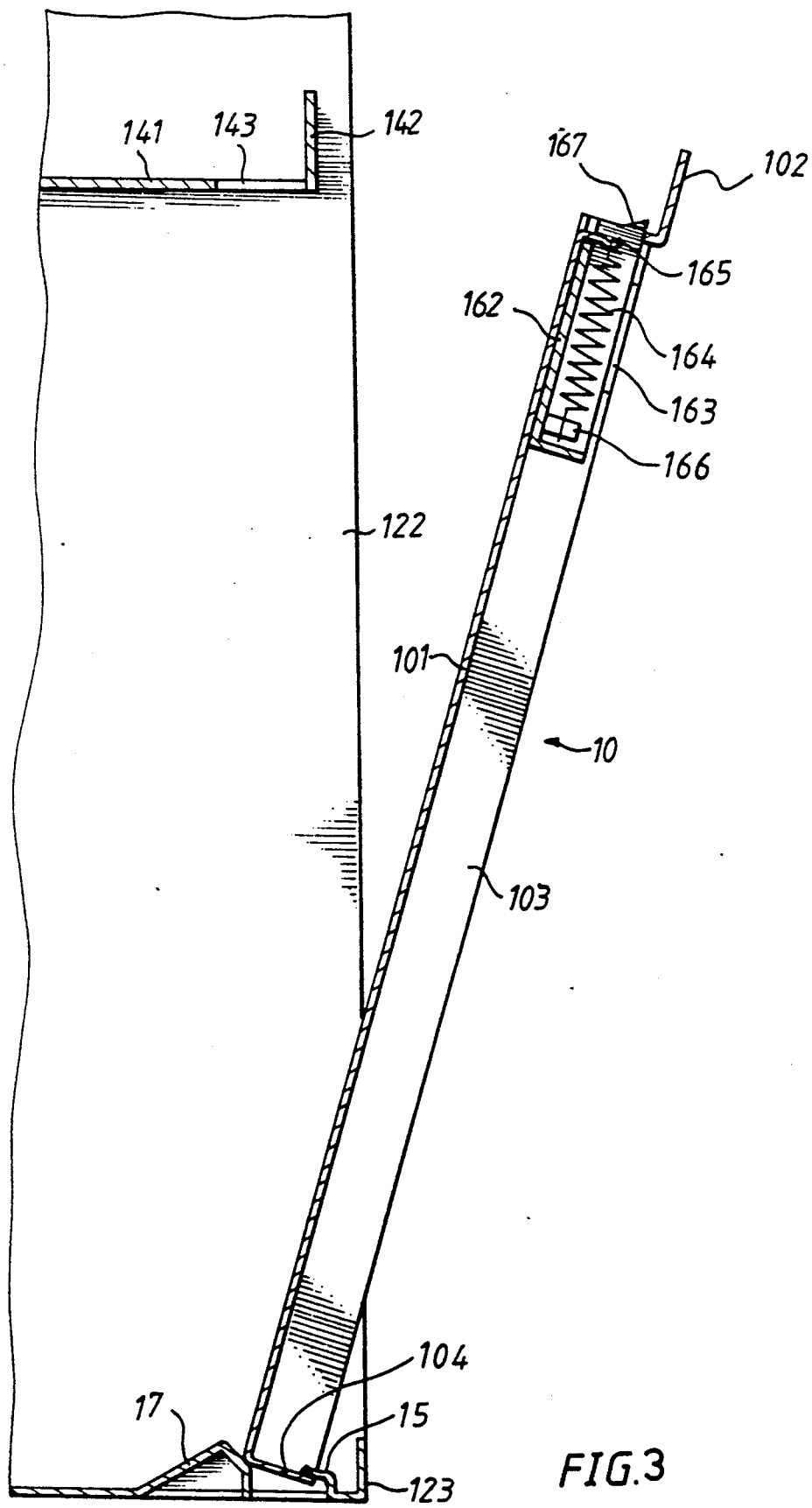
FIG. 3 is a cross-sectional view illustrating the installation of a mother board mounting plate, wherein the mother board mounting plate is in an inclined position with the bottom edge thereof being gripped and held by the grippers and positioning blocks.
Figure 4:
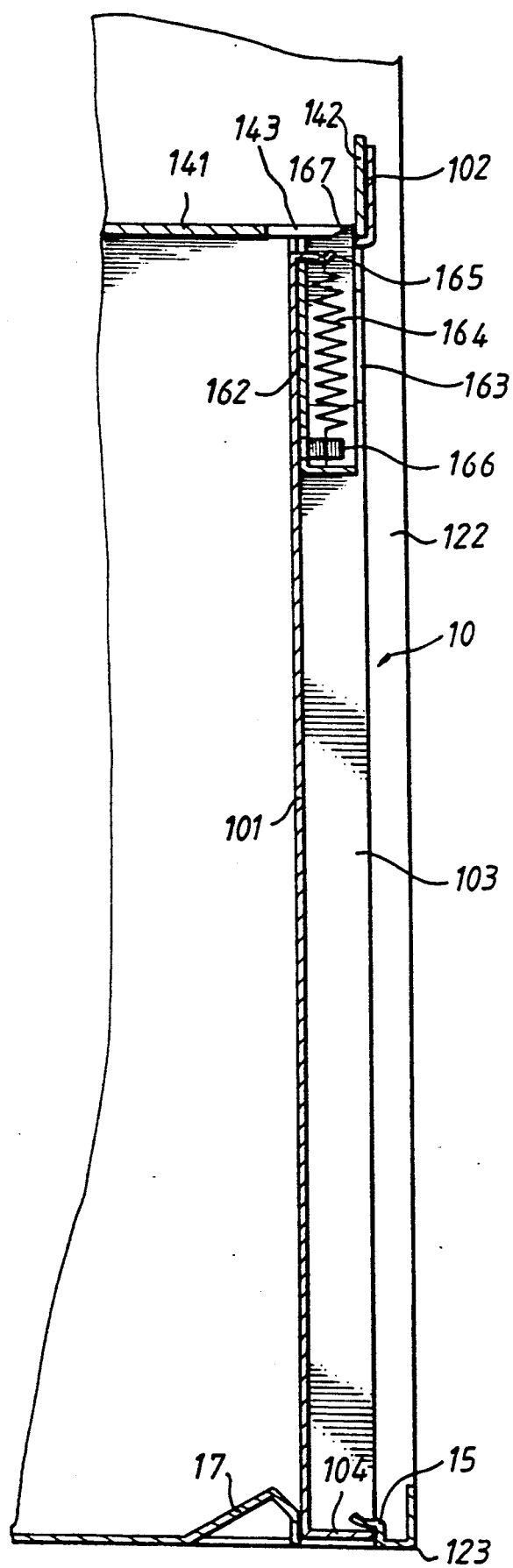
FIG. 4 is a cross-sectional view illustrating the completely installed mother board mounting plate, wherein the bottom edge thereof is completely fixed by grippers and positioning blocks and the top edge thereof is secured to a support bracket by the protruding lugs of the fastener engaging with the slots formed on the support bracket.
Figure 5:
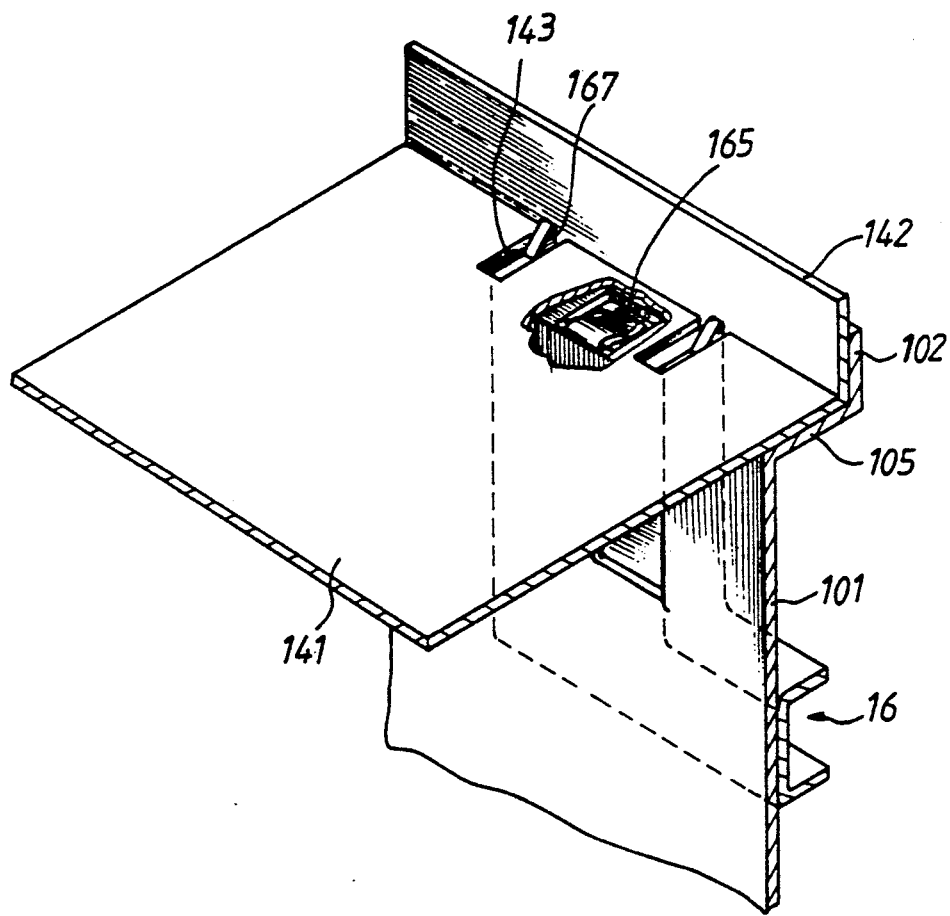
FIG. 5 is an enlarged view of a portion of a mother board mounting plate and a support bracket illustrating the securing of the mother board mounting plate to the base frame by the protruding lugs of the fastener engaging with the slots formed on the support bracket.

Further referring to FIGS. 3 and 4, to install the mother board mounting plate 10, the mounting plate 10 is first positioned in an inclined orientation with the bottom edge member 104 thereof slightly hooked by the gripper 15. The top edge 105 of the mother board mounting plate 10 is then pushed toward the base frame 12 with the gripper 15 as the pivot so as to make the connecting portion between the plate body 101 and the bottom edge member 104 slide down along an inclined surface formed on the positioning block 17 and the bottom edge 104 move further into the gripper 15. When the mother board mounting plate 10 is further pushed forward, the inclined surface of each of the protruding lugs 167 of the fastener 16 will come into contact with the connecting portion between the bracket body 141 and the flange 142 of the support bracket 14 to push the fastener 16 downward so as to allow the mother board mounting plate 10, along with the fastener 16, to move further to such a position that the fastener 16 is capable of being sprung upward again by the extension springs 164 to have the protruding lugs 167 thereof received in the corresponding slots 143 of the bracket body 141, as shown in FIG. 5. This secures the mother board mounting plate 10, in an upstanding position, on the base frame. Besides, the further movement of the mother board mounting plate 10 is also prevented by the stopping strip 102. To dismantle the mother board mounting plate 10, simply push the fastener 16 downward to disengage the protruding lugs 167 from the slots 143 of the support bracket 14 and then slightly pull the mother board mounting plate 10 outward.

Figure 6:
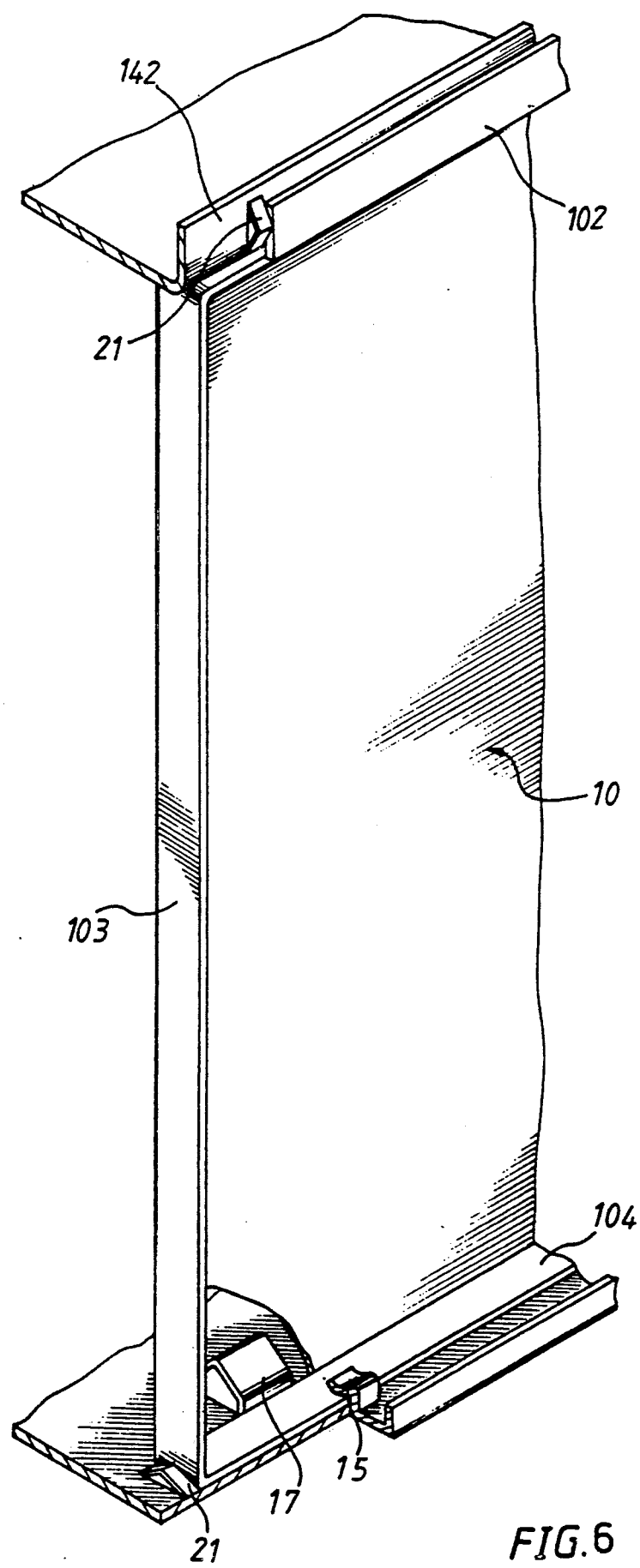
FIG. 6 is a perspective view of a portion of the base frame, the mother board mounting plate and the support bracket to show the guiding and securing of the mother board mounting plate.

Furthermore, as shown in FIG. 6, it is possible to provide guiding blocks 21 on the flange 142 of the support bracket 14 and the bottom plate 123 of the base frame 12 to more precisely position the mother board mounting plate 10 during the installation thereof.

Of course it is understood that the above is merely a preferred embodiment of the invention and that various changes and alterations can be made without departing from the spirit and broader aspects thereof as set forth in the appended claims.

I claim:

1. In a personal computer comprising a casing inside which is a base frame constituted by a front plate and a rear plate with a bottom plate and a support bracket secured between said front plate and said rear plate, an upstanding mother board structure comprising:

a rectangular pan-like mounting plate for mounting a mother board thereon, said mounting plate comprising a plate body having a top edge member, a bottom edge member and two lateral edge members in a normal direction to said plate body, said top edge member having a stopping strip extending therealong perpendicularly to said top edge member;

a slidable U-shaped fastener comprising a linear section, two sections perpendicular to said linear section for said U-shape, each of said perpendicular sections having a pair of protruding lugs on an end thereof, a pair of guiding members on said plate body respectively for slidably guiding said perpendicular sections on said mounting plate, and extension springs for urging said protruding lugs to extend out of said top edge member, each extension spring having a first end attached to said mounting plate and a second end attached to a respective one of said perpendicular sections of said fastener; and at least one combination of gripper and positioning block opposite to each other on said bottom plate of said base frame in proximity to an edge of said bottom plate such that, when said mounting plate is being installed, the bottom edge member thereof is gripped and guided by said combination of gripper and positioning block and said protruding lugs of said fastener are received in slots in said support bracket with said stopping strip contacting and abutting against a flange formed on said support bracket, whereby said mounting plate is secured between said bottom plate and said support bracket in an upstanding position.

2. A mother board structure as claimed in claim 1, wherein said first end of each of said extension springs is fixed to a first projection on said mounting plate and said second end of each of said extension springs is fixed to a second projection on said perpendicular sections of said fastener.

3. A mother board structure as claimed in claim 1, wherein each of said protruding lugs of said fastener comprises an inclined surface.

4. A mother board structure as claimed in claim 1, wherein each of said positioning blocks comprises an inclined surface.

5. A mother board sutructure as claimed in claim 1, wherein said based frame further comprises guiding blocks on said bottom plate for positioning said mounting plate during said installing of said mounting plate.

6. A mother board structure as claimed in claim 1, wherein said support bracket further comprising guiding blocks on said flange thereof for positioning said mounting plate during said installing of said mounting plate.

* * * * *